(12) United States Patent
Yoshinaka

(10) Patent No.: US 12,591,282 B2
(45) Date of Patent: Mar. 31, 2026

(54) RESET CIRCUIT AND METHOD FOR DESIGNING RESET CIRCUIT

(71) Applicant: JAPAN AVIATION ELECTRONICS INDUSTRY, LIMITED, Tokyo (JP)

(72) Inventor: Akira Yoshinaka, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 131 days.

(21) Appl. No.: 18/758,501

(22) Filed: Jun. 28, 2024

(65) Prior Publication Data

US 2025/0068218 A1    Feb. 27, 2025

(30) Foreign Application Priority Data

Aug. 21, 2023    (JP) .................................. 2023-134102

(51) Int. Cl.
*G06F 1/24* (2006.01)

(52) U.S. Cl.
CPC ..................................... *G06F 1/24* (2013.01)

(58) Field of Classification Search
CPC .................................................... G06F 1/24
See application file for complete search history.

(56) References Cited

U.S. PATENT DOCUMENTS 3,183,367 A * 5/1965 Van Berkel .......... H03K 23/002
377/118

4,520,418 A * 5/1985 Susi ..................... H03K 17/223
327/143
4,607,178 A * 8/1986 Sugie ................... H03K 17/223
327/143

(Continued)

FOREIGN PATENT DOCUMENTS

JP       H09-26835 A       1/1997
JP       2004-80772 A      3/2004

OTHER PUBLICATIONS

European Search Report for App. No. EP 24 18 9597, dated Dec. 19, 2024.

(Continued)

*Primary Examiner* — Zahid Choudhury
(74) *Attorney, Agent, or Firm* — GREENBLUM & BERNSTEIN, P.L.C.

(57) ABSTRACT

The reset circuit according to the disclosure includes a resistor, a diode, a capacitor, a power input terminal, a power return terminal, and an output terminal which outputs a reset signal. The power input terminal, the resistor, the capacitor, and the power return terminal are connected in series in this order. The diode is connected in parallel with the resistor between the power input terminal and the capacitor. The output terminal is connected to a high potential side of the capacitor. When a reverse resistance of the diode at temperature T, the resistor's resistance, and the capacitor's capacitance are each denoted as $R_D(T)$, R, and C, a time constant of the reset circuit at the temperature T is given by $CRR_D(T)/(R+R_D(T))$, whereby the time needed for output signal to rise from zero to the reset release threshold voltage was made longer than the specified time for the reset operation.

8 Claims, 6 Drawing Sheets

CR TYPE RESET CIRCUIT

(56) References Cited

U.S. PATENT DOCUMENTS

| 4,670,676 | A | * | 6/1987 | Nishitani | .................. | G06F 1/24 |
| | | | | | | 327/143 |
| 2004/0036514 | A1 | * | 2/2004 | Kwon | .................. | H03K 17/223 |
| | | | | | | 327/143 |
| 2007/0103211 | A1 | * | 5/2007 | Hsieh | ........................ | G06F 1/24 |
| | | | | | | 327/143 |
| 2012/0159225 | A1 | * | 6/2012 | Fleischman | ........... | G06F 1/3206 |
| | | | | | | 713/340 |

OTHER PUBLICATIONS

"What is benefit of diode in the RC circuit", Electrical Enginnering Stack Exchange, Nov. 4, 2017, pp. 1-4.

* cited by examiner

CR TYPE RESET CIRCUIT $$V_1 = V_{CC}\left(1 - e^{\left(-\frac{t}{CR}\right)}\right)$$

REVERSE RESISTANCE $R_D [\Omega]$ $V_{CC}$

24

2

$R[\Omega]$

21

23

26

$C[F]$

22

$V_1$

25

12

$V_{CC}$

11

CPU

RESET PORT

12

$$V_1 = V_{CC}\left(1 - e^{\left(-\frac{t}{CR_1}\right)}\right) \quad R_1 = \frac{RR_D}{R + R_D}$$

$V_1$ $V_{CC}$ $V_T$

AT HIGH TEMPERATURE

AT ROOM TEMPERATURE

0   $t_2$   $t_d$   $t_1$   $t$

CPU STATE   OPERATION   RESET   OPERATION $$V_1 = V_{CC}\left(1 - e^{\left(-\frac{t}{C'R_2}\right)}\right) \quad R_2 = \frac{R'R_D}{R' + R_D}$$

AT HIGH TEMPERATURE $\quad V_1 = V_{CC}\left(1 - e^{\left(-\frac{t}{C'R_2}\right)}\right) \quad R_2 = \dfrac{R'R_D}{R' + R_D}$ AT ROOM TEMPERATURE $\quad V_1 = V_{CC}\left(1 - e^{\left(-\frac{t}{C'R'}\right)}\right)$ $$V_1 = V_{CC}\left(1 - e^{\left(-\frac{t}{C_1 R_3}\right)}\right) \quad R_3 = \frac{R R_D}{R + R_D}$$

CPU STATE    OPERATION | RESET | OPERATION

RESET CIRCUIT AND METHOD FOR DESIGNING RESET CIRCUIT

TECHNICAL FIELD

The disclosed technology relates to a reset circuit which stably operates in a high temperature environment where diode leakage current is not negligible.

BACKGROUND ART

For example, if a drive voltage of a central processing unit (CPU) is momentarily interrupted, internal circuits (semiconductor elements such as logic gates and memory) of the CPU malfunction, and operations do not proceed normally even if the drive voltage is restored to a normal value. In such a case, the CPU needs to be initialized. This is called reset.

Note that, in this specification, IC chips with names such as a micro processor unit (MPU), a micro controller unit (MCU), and a digital signal processor (DSP) are also collectively referred to as CPU.

Many CPUs have a reset port and receive a reset signal at the reset port. A reset signal is produced by a dedicated reset circuit. FIG. 1A schematically illustrates the reset circuit and the CPU. $V_{CC}$ denotes a drive voltage source (and a voltage value) of the reset circuit and the CPU, and 12 denotes ground.

FIG. 1B schematically illustrates a relation between reset circuit output and CPU state. The CPU starts or maintains an operation state when the reset circuit output is "High", while the CPU transitions to a reset state when the reset circuit output becomes "Low".

In initializing the CPU, the CPU waits for a system clock to stabilize and initializes internal circuits and therefore, a predetermined period of time (hereinafter, denoted as $t_d$) is required for resetting. Accordingly, a "Low" signal is required to be maintained longer than $t_d$. If the "Low" signal is shorter than $t_d$, the reset fails.

[CR Type Reset Circuit]

FIG. 2A illustrates one (CR type reset circuit) of specific examples of a circuit for producing High signals and Low signals. A similar circuit is introduced in Stack Exchange Network, "What is benefit of diode in the RC circuit", [retrieved from the internet on Jan. 24, 2024], <https://electronics.stackexchange.com/questions/338078/what-is-benefit-of-diode-in-the-rc-circuit>.

A CR type reset circuit 2 includes a resistor 21, a capacitor 22, a diode 23, a power input terminal 24, a power return terminal 25, and an output terminal 26. The power input terminal 24 is connected to $V_{CC}$ and the power return terminal 25 is connected to the ground 12.

The resistor 21 and the capacitor 22 are arranged in series between the power input terminal 24 and the power return terminal 25. The diode 23 is arranged in parallel with the resistor 21 between the power input terminal 24 and the capacitor 22. The diode 23 is arranged in a manner such that a cathode is on the power input terminal 24 side and an anode is on the capacitor 22 side. The output terminal 26 outputs a voltage of a high potential side of the capacitor 22.

Assuming that the resistance of the resistor 21 is R [Ω], the capacitance of the capacitor 22 is C [F], and the output voltage of the output terminal 26 is $V_1$ [V], when the voltage $V_{CC}$ is supplied to the CR type reset circuit 2 with capacitor charge of 0 [F] at time t=0, an output voltage $V_1$ on and after t=0 is expressed by the following formula.

$$V_1(t) = V_{CC}\left(1 - e^{-\frac{t}{CR}}\right) \tag{1}$$

The CPU recognizes a reset port input as a High signal when the input is equal to or higher than a predetermined voltage, and as a Low signal when the input is less than the predetermined voltage. Suppose the predetermined voltage is $V_T$ and $t_1$ satisfies $V_1(t_1)=V_T$, the CR type reset circuit 2 outputs a Low signal when $0<t<t_1$ and outputs a High signal when $t_1<t$.

When t is sufficiently large, $V_1$ becomes nearly equal to $V_{CC}$. $V_1(t)$ for t<0 in the graph in FIG. 2B represents the state where $V_1$ became nearly equal to $V_{CC}$.

When $V_1 \sim V_{CC}$, the capacitor 22 is fully charged.

For resetting, $V_{CC}$ of the CR type reset circuit 2 is once set to zero. Then, the charge stored in the capacitor 22 flows in a forward direction through the diode 23 and is quickly discharged through the power input terminal 24. This allows the CR type reset circuit 2 to achieve a transition from a High signal to a Low signal across t=0.

As mentioned above, $t_1$ needs to be equal to or greater than $t_d$. From Formula (1), time $t_1$ when $V_1$ becomes $V_T$ is obtained as Formula (2).

$$t_1 = CR\log\left(\frac{V_{CC}}{V_{CC} - V_T}\right) \tag{2}$$

Here, log is a natural logarithm (hereinafter, the same is applied in this specification).

Since $V_{CC}$ and $V_T$ are values determined by specifications of the CPU, $t_1 \geq t_d$ is achieved by adjusting C and R.

<Time Constant of CR Type Reset Circuit 22>

The denominator in the exponent (the product of C and R for the CR type reset circuit 2) of the exponential function in Formula (1) is called a "time constant" and has a dimension of "time". When CR [seconds] elapses, $V_1$ rises from zero to approximately 63% of $V_{CC}$, and when 2CR [seconds] elapses, $V_1$ rises to approximately 86% of $V_{CC}$. Thus, a time constant represents characteristics of a transient response (fast or slow rise) of a CR circuit.

[Reset IC]

Reset circuits (reset ICs) that employs transistors to reduce power consumption are also commercially available. Transistors have a micro current called OFF leakage current which rapidly increases at high temperatures, and output of reset ICs fluctuates depending on the ambient temperature. Technologies have been developed to achieve a stable operation against ambient temperature change (for example, Japanese Patent Application publication gazette No. 2004-80772).

SUMMARY OF THE INVENTION

CPUs are sometimes desired to be used in a high temperature environment of approximately 200° C. For example, in drilling for shale oil, the drilling has to be performed along a shale layer that stores oil. Therefore, a drilling drill is equipped with a sensor that measures a position and a direction. In such case, a sensor control chip needs to stably operate in the environment of approximately 200° C.

Existing reset ICs are designed to be used at 100° C. or less at best, and there are no reset ICs that are guaranteed to operate at 200° C. In fact, reset ICs malfunction at temperatures as high as 200° C., being unable to withstand use at high temperatures.

High temperature environments cause higher failure rates and shorter lifespans of electronic components. As the number of components increases, the number of components which may fail increases. Therefore, it is desirable that electronic components to be applied in high temperature environments are as simple a circuit as possible and a circuit using as simple elements as possible. In this sense, CR type reset circuits are more promising than reset ICs.

An operation of a CR type reset circuit at high temperature will be discussed with reference to FIGS. 3A and 3B.

Reverse resistance of a diode can be considered to be infinite at room temperature, but the reverse resistance drops at high temperature, resulting in non-negligible leakage currents.

When the reverse resistance of the diode 23 is denoted as $R_D$ [Ω], the output voltage of the output terminal 26 is expressed as the following.

$$V_1(t) = V_{CC} \left( 1 - e^{-\frac{t}{CR_1}} \right) \tag{3}$$

Here, $R_1$ denotes the following.

$$R_1 = \frac{R R_D}{R + R_D} \tag{4}$$

Time $t_2$ during which $V_1$ rises from 0 to $V_T$ in a high temperature environment is obtained from Formula (3) and Formula (4) as the following.

$$t_2 = CR_1 \log\left( \frac{V_{CC}}{V_{CC} - V_T} \right) = C \frac{R}{1 + \frac{R}{R_D}} \log\left( \frac{V_{CC}}{V_{CC} - V_T} \right) \tag{5}$$

When $R/R_D$ is negligibly small, $t_2 = t_1$ is satisfied. As $R_D$ decreases (as an operating environment becomes hotter), $t_2$ becomes shorter. When $t_2$ becomes shorter than $t_d$, reset fails.

It is desirable that a diode with low leakage current (large $R_D$) even at high temperature can be used, but diodes which maintain a sufficient reverse resistance at 200° C. are not generally available at present.

To solve the above described problems, a reset circuit according to the disclosed technology includes a resistor, a diode, a capacitor, a power input terminal, a power return terminal, and an output terminal which outputs a reset signal.

The power input terminal, the resistor, the capacitor, and the power return terminal are connected in series in an order of the power input terminal, the resistor, the capacitor, and the power return terminal.

The diode is connected in parallel with the resistor between the power input terminal and the capacitor in a manner such that a cathode is on a side closer to the power input terminal and an anode is on a side closer to the capacitor.

The output terminal is connected to the capacitor on a side being closer to the resistor.

When a high temperature at which the reset circuit is operated is denoted as T, a reverse resistance of the diode at the temperature T is denoted as $R_D(T)$, a resistance of the resistor is denoted as R, and capacitance of the capacitor is denoted as C, a time constant of the reset circuit at the temperature T is given by $CRR_D(T)/(R+R_D(T))$.

Regarding the output signal of the reset circuit, time during which the reset signal rises from zero volt to a reset release threshold voltage (rise time) at the temperature T is equal to or longer than specified time for the reset operation specified by the CPU.

According to the reset circuit of the disclosed technology, a reset circuit which operates at high temperature with low failure rate can be realized.

DETAILED DESCRIPTION OF THE EMBODIMENTS

Figure 1A:
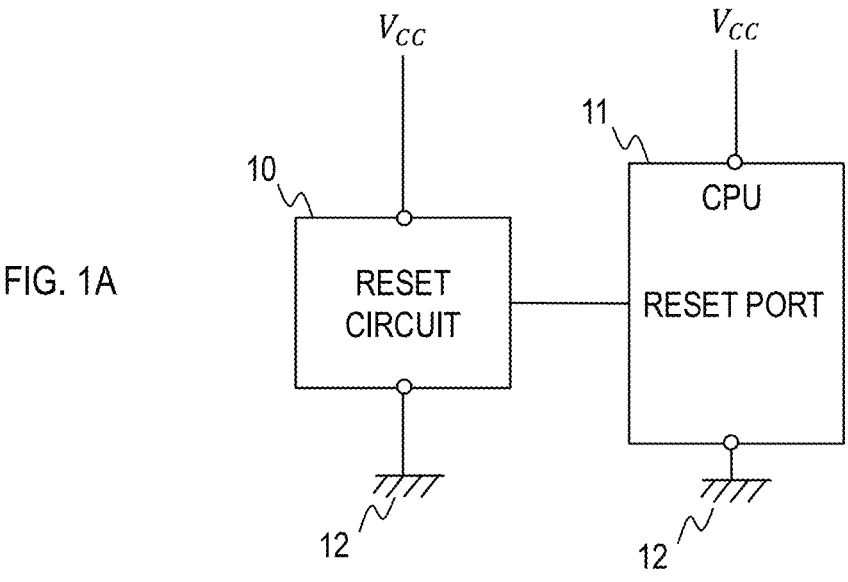
FIG. 1A schematically illustrates a reset circuit and a CPU to be reset.
Figure 1B:
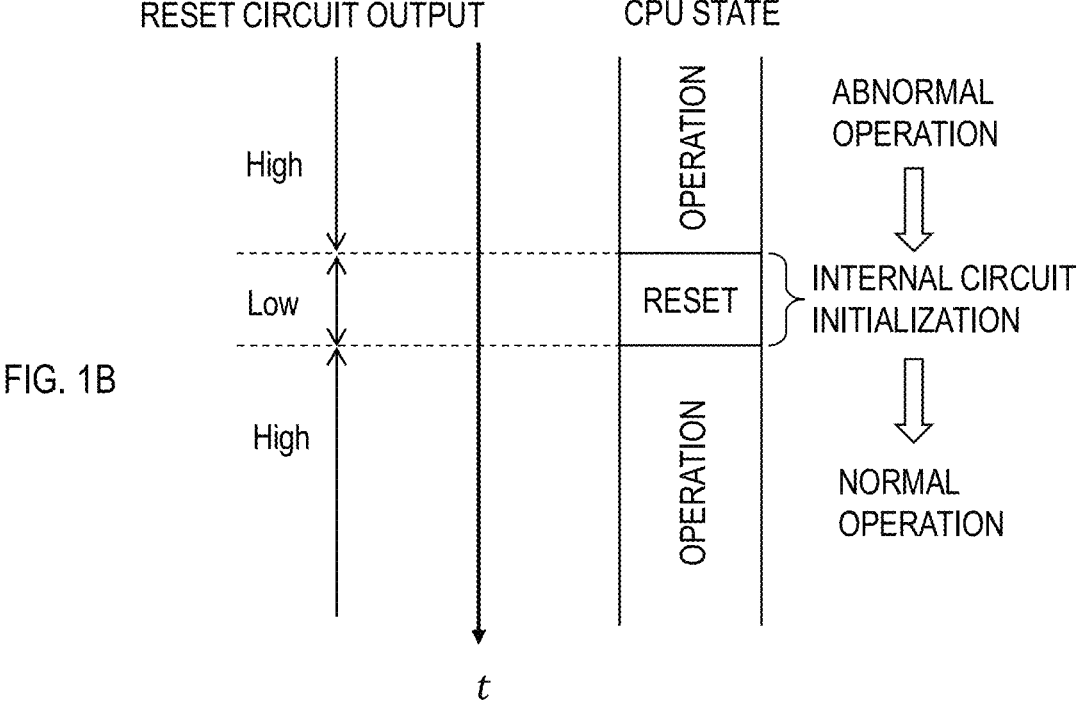
FIG. 1B schematically illustrates a relation between reset circuit output and CPU state.
Figures 2A, 2B:
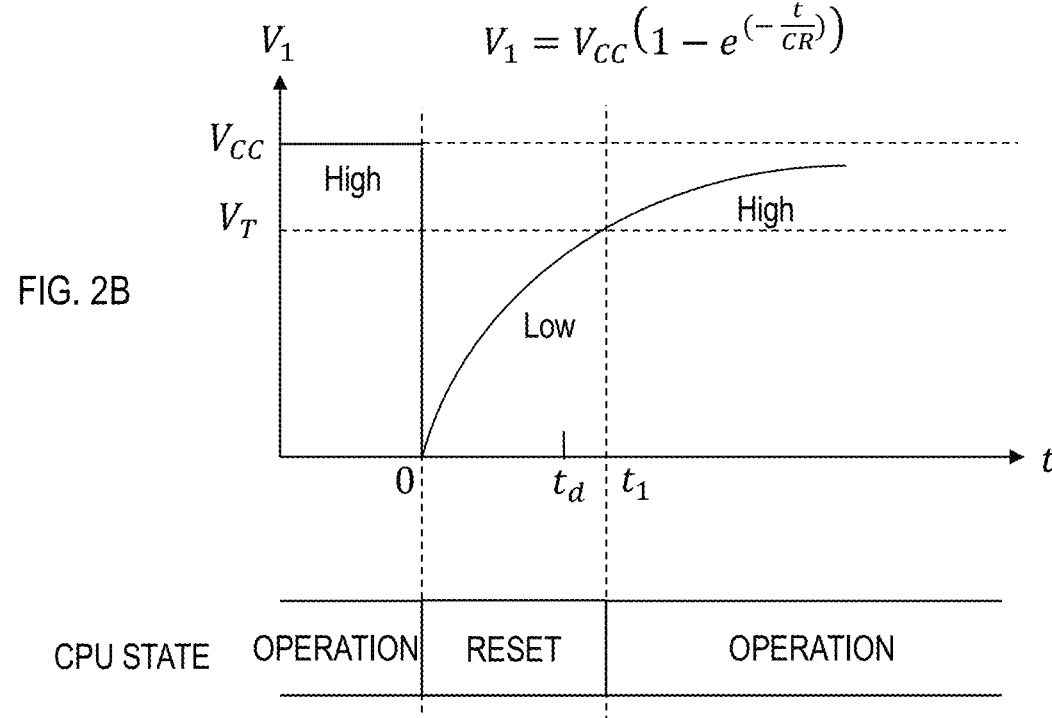
FIG. 2A is a diagram for explaining a configuration of a CR type reset circuit.
FIG. 2B is a diagram for explaining an output signal of a CR type reset circuit.
Figures 3A, 3B:
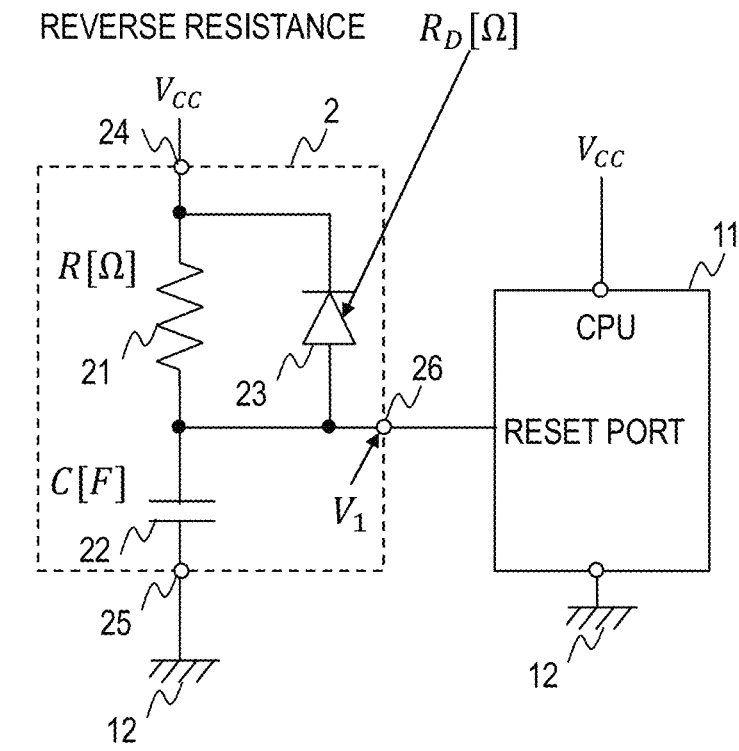
FIG. 3A is a diagram showing resistance which cause problems at high temperature.
FIG. 3B is a diagram for explaining a problem of an operation of a CR type reset circuit at high temperature.

Embodiments according to the disclosed technology will be described in detail below. Here, components having the same functions will be provided with the same reference characters and the repeated description thereof will be omitted.

First Embodiment

The inventors of the present application found that characteristic values, such as $R_D$, of semiconductor encapsulated in, for example, glass or ceramic are highly reproducible in an environment of 200° C. or higher, and found that an analog circuit exhibiting favorable high temperature stability can be obtained by combining a passive element using a material having favorable temperature characteristics with the encapsulated semiconductor. Capacitance C of a capacitor and a resistance R of a resistor are adjustable amounts in the CR type reset circuit. Hence, C and R are adjusted to obtain a CR type reset circuit whose time during which $V_1$ rises from 0 to $V_T$ (hereinafter, referred to as "rise time") is longer than $t_d$ even at high temperature, resulting in successful reset operation.

Figure 4A:
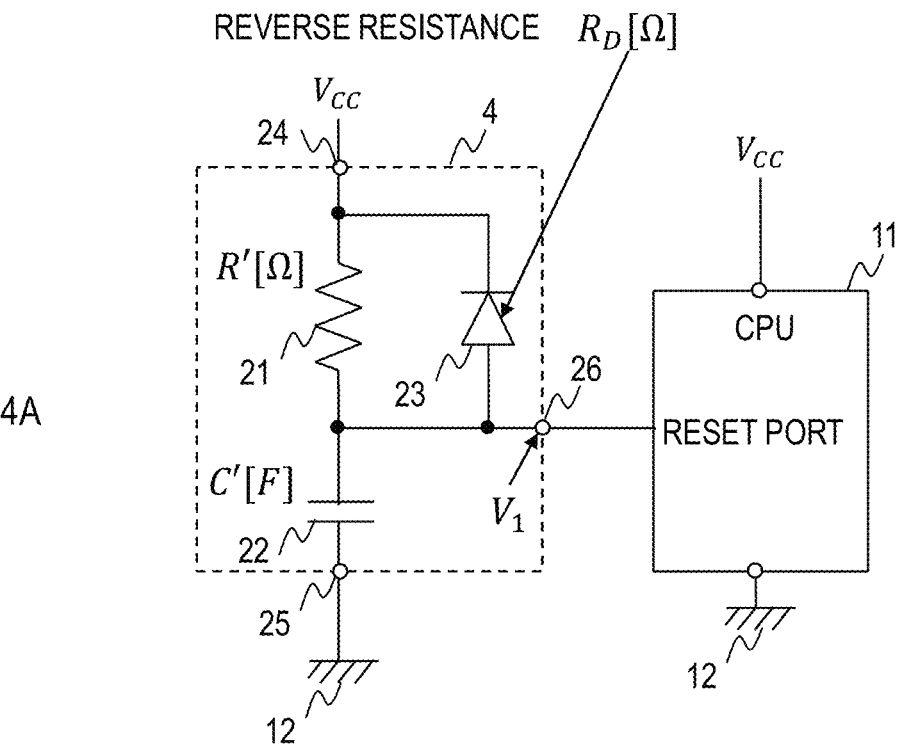
FIG. 4A is a diagram for explaining a configuration of a reset circuit according to a first embodiment.
Figure 4B:
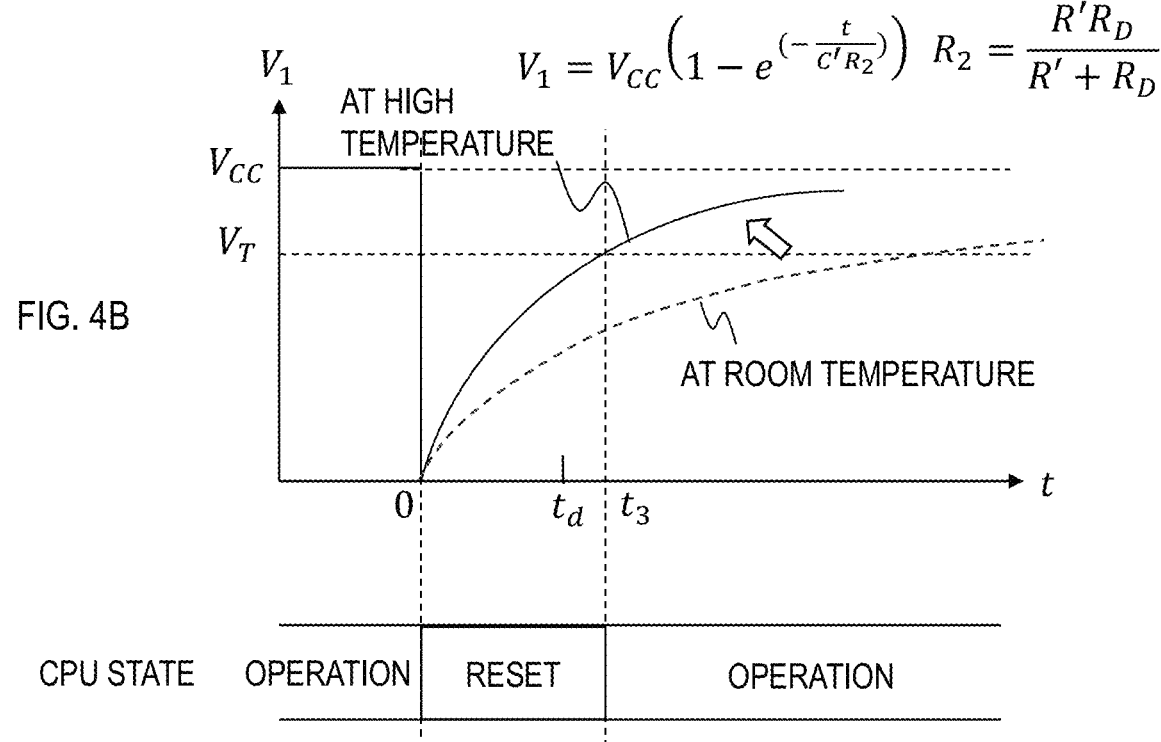
FIG. 4B is a diagram for explaining a method for designing the reset circuit according to the first embodiment.

This will be described with reference to FIGS. 4A and 4B. A CR type reset circuit 4 includes a resistor 21, a capacitor

22, a diode 23, a power input terminal 24, a power return terminal 25, and an output terminal 26. Connection between the elements is the same as the CR type reset circuit 2 described above.

The reverse resistance $R_D(T)$ of the diode 23 at the temperature T, at which the CPU is to be operated, is first measured.

Subsequently, a resistance R' of the resistor 21 and capacitance C' of the capacitor 22 are determined.

Based on Formula (5), rise time $t_3$ of the CR type reset circuit 4 at the temperature T is given by the following formula.

$$t_3 = C' \frac{R' R_D(T)}{R' + R_D(T)} \log\left(\frac{V_{CC}}{V_{CC} - V_T}\right) \quad (6)$$

Since $V_{CC}$ and $V_T$ are specified values and $R_D(T)$ is a measured value, $t_3$ is determined by giving C' and R'. C' and R' of the CR type reset circuit 4 are determined so as to satisfy Formula (7) below.

$$t_d \le C' \frac{R' R_D(T)}{R' + R_D(T)} \log\left(\frac{V_{CC}}{V_{CC} - V_T}\right) \quad (7)$$

As a result, the CR type reset circuit 4 in which $t_3$ is longer than $t_d$ can be obtained.

This is the description of the first embodiment.

Second Embodiment

In the first embodiment, the conditions of C' and R' are determined focusing only on rise time in a high temperature environment. In a second embodiment, conditions of C' and R' will be determined focusing on rise time at room temperature as well.

Figure 5A:
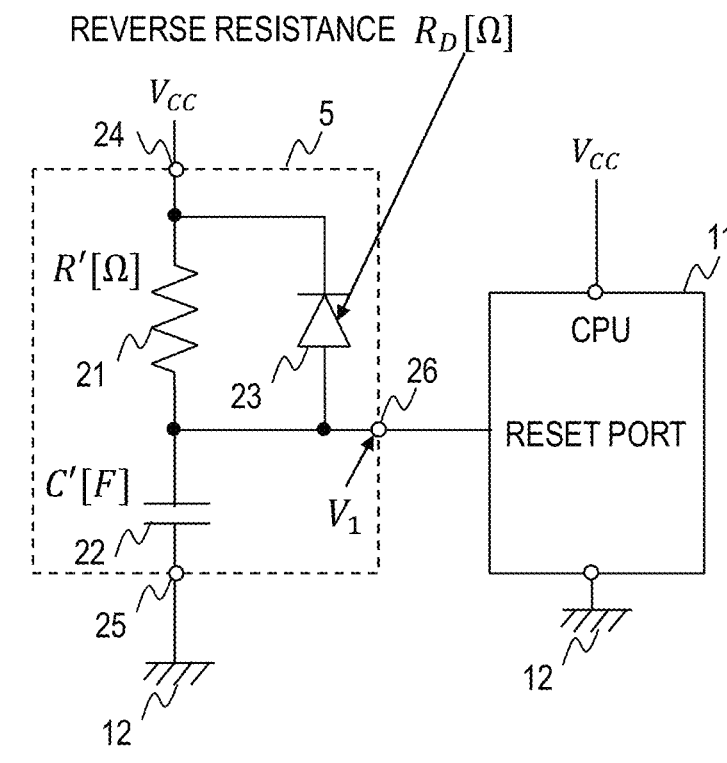
FIG. 5A is a diagram for explaining a configuration of a reset circuit according to a second embodiment.
Figure 5B:
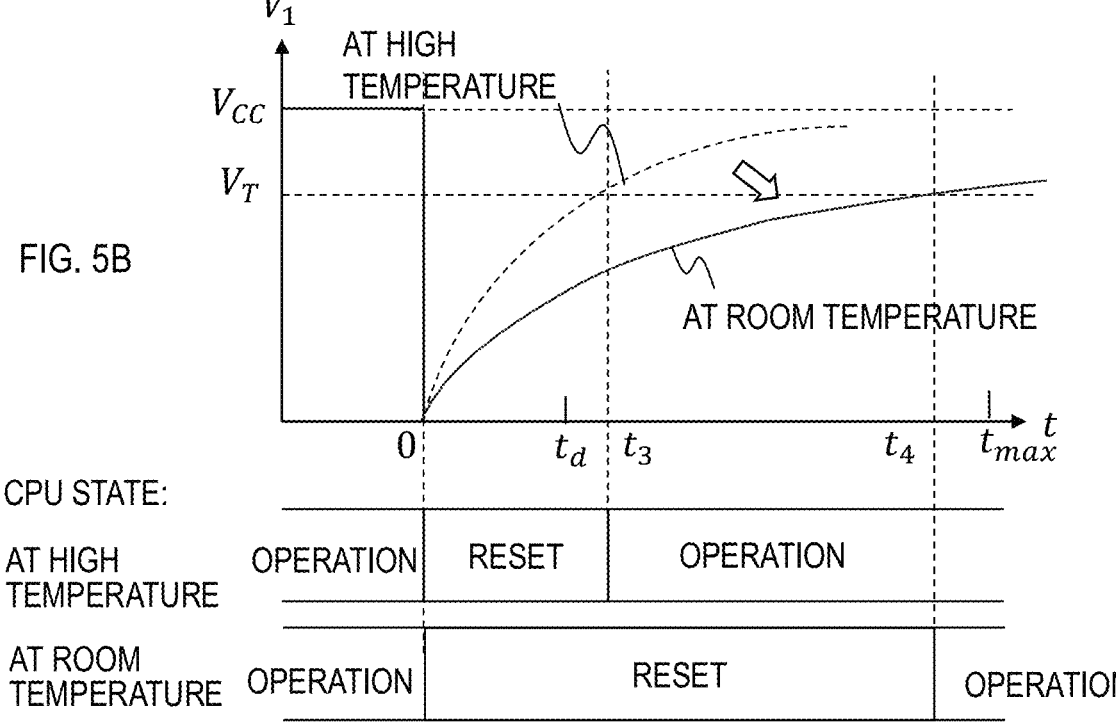
FIG. 5B is a diagram for explaining a method for designing the reset circuit according to the second embodiment.

This will be described with reference to FIGS. 5A and 5B.

Rise time $t_4$ when the CR type reset circuit 4 of the first embodiment is operated at room temperature is given by Formula (8) below.

$$t_4 = C' R' \log\left(\frac{V_{CC}}{V_{CC} - V_T}\right) \quad (8)$$

For example, when $R_D$=50 kΩ is obtained and R'=1000 kΩ is set, $R' R_D(T)/(R'+R_D(T))$=47.6 kΩ is obtained. Thus, the rise time at room temperature reaches approximately 20 times the rise time at high temperature.

For some applications, too long rise time (time required for resetting) is not acceptable. Accordingly, a rise time tolerable limit $t_{max}$ at room temperature is determined so as to limit ranges of C' and R'. Its condition is given by Formula (9).

$$t_{max} \ge C' R' \log\left(\frac{V_{CC}}{V_{CC} - V_T}\right) \quad (9)$$

In summary, a CR type reset circuit 5 according to the second embodiment is a circuit whose C' and R' satisfy Formulas (7) and (9) and a reset circuit in which $t_3$ is longer than $t_d$ and $t_4$ is shorter than $t_{max}$.

This is the description of the second embodiment.

Modification of Second Embodiment

Assuming that R' is determined to be larger than $R_D(T)$, Formula (7) can be transformed as the following.

$$t_d \le C' \frac{R_D(T)}{1 + \frac{R_D(T)}{R'}} \log\left(\frac{V_{CC}}{V_{CC} - V_T}\right) \cong C' R_D(T) \log\left(\frac{V_{CC}}{V_{CC} - V_T}\right) \quad (10)$$

C' and R' are determined by using Formulas (7) and (9) in the second embodiment, but C' and R' are determined by using Formulas (9) and (10) in the present modification.

What is determined by Formula (10) is only C'. Once C' is determined, only R' needs to be determined by Formula (9). This facilitates the design of C' and R'.

This is the description of the modification of the second embodiment.

Third Embodiment

Both of the resistance of the resistor and the capacitance of the capacitor are adjusted so that the rise time becomes $t_d$ or longer in a high temperature environment in the first and second embodiments, while only the capacitance of the capacitor will be adjusted in a third embodiment.

Specifically, for a CR type reset circuit which realizes $t_d$ or longer rise time at room temperature, only C is changed while R is kept fixed.

Figures 6A, 6B:
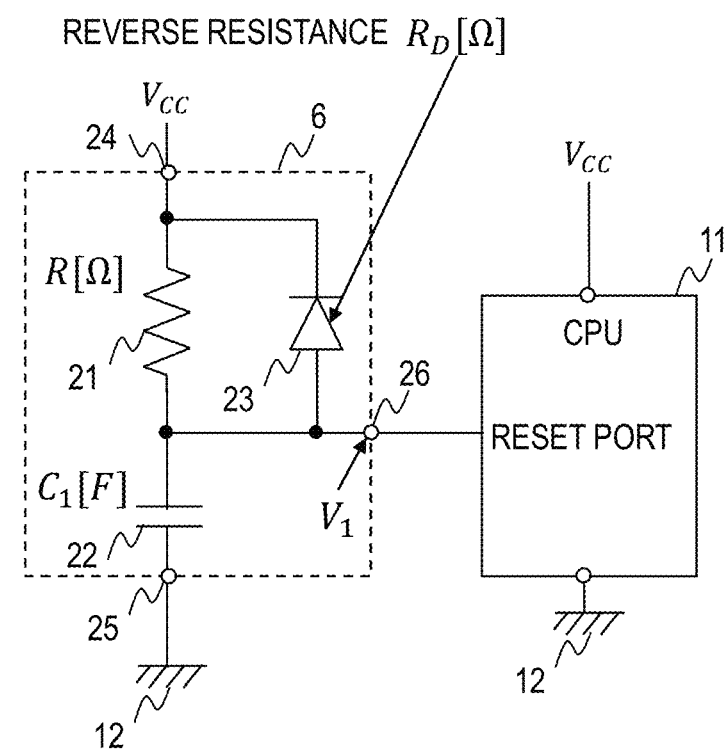
FIG. 6A is a diagram for explaining a configuration of a reset circuit according to a third embodiment.
FIG. 6B is a diagram for explaining a method for designing the reset circuit according to the third embodiment.

The third embodiment will be described with reference to FIGS. 6A and 6B.

When a resistance of the resistor 21 is denoted as R and capacitance of the capacitor 22 before change is denoted as $C_0$, rise time $t_5$ at room temperature is expressed as Formula (11) below.

$$t_5 = C_0 R A = a t_d \quad (11)$$

Here, A denotes $\log (V_{CC}/(V_{CC}-V_T))$. Further, if R is chosen to make $t_5 \ge t_d$, $a \ge 1$.

When a reverse resistance of the diode at the temperature T is denoted as $R_D(T)$, rise time $t_6$ at the temperature T is expressed as Formula (12) below.

$$t_6 = C_0 \frac{R R_D(T)}{R + R_D(T)} A \quad (12)$$

When $t_6$ is smaller than $t_d$, reset fails.

Suppose the capacitance of the capacitor 22 is changed to $C_1$ and rise time $t_7 \ge t_d$ at the temperature T is obtained.

$$t_7 = C_1 \frac{R R_D(T)}{R + R_D(T)} A = b t_d \quad (13)$$

Since $t_7 \geq t_d$, $b \geq 1$. Formula (14) is obtained from Formulas (13) and (11).

$$bt_d = C_1 \frac{R_D(T)}{1 + \frac{R_D(T)}{R}} A = C_1 \frac{R_D(T)}{1 + R_D(T) \frac{C_0 A}{a t_d}} A \qquad (14)$$

Transforming Formula (14), Formula (15) below is obtained.

$$C_1 = \frac{b}{a} C_0 + \frac{bt_d}{R_D(T)A} = b \left( \frac{C_0}{a} + \frac{t_d}{R_D(T) \log\left(\frac{V_{CC}}{V_{CC} - V_T}\right)} \right) \qquad (15)$$

Meaning of Formula (15) is as follows.

$C_0$, a, $t_d$, $R_D(T)$, $V_{CC}$, and $V_T$ are known or given values.

In a CR type reset circuit 6 having $C_1$ obtained based on b=1, the rise time at high temperature is exactly $t_d$.

That is, the capacitance $C_1$ can be obtained by determining b, which is 1 or greater, depending on the desired rise time.

This is the description of the third embodiment.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable those of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for designing a reset circuit which outputs a reset signal to a CPU in a high temperature environment, the reset circuit including a resistor, a diode, a capacitor, a power input terminal, a power return terminal, and an output terminal which outputs a reset signal, the power input terminal, the resistor, the capacitor, and the power return terminal being connected in series in an order of the power input terminal, the resistor, the capacitor, and the power return terminal, the diode being connected in parallel with the resistor between the power input terminal and the capacitor in a manner such that a cathode is on a side closer to the power input terminal and an anode is on a side closer to the capacitor, and the output terminal being connected to the capacitor on a side being closer to the resistor, the method comprising:

measuring a reverse resistance $R_D(T)$ of the diode at high temperature T, at which the reset circuit is operated;

obtaining specified time $t_d$ for a reset operation, the specified time $t_d$ being specified by the CPU, a drive voltage $V_{CC}$ of the reset circuit, and a reset release voltage $V_T$; and determining capacitance C of the capacitor and a resistance R of the resistor so that the capacitance C and the resistance R satisfy a following formula:

$$t_d \leq C \frac{R R_D(T)}{R + R_D(T)} \log\left(\frac{V_{CC}}{V_{CC} - V_T}\right).$$

2. The method for designing a reset circuit according to claim 1, wherein a maximum tolerable value of rise time of the reset circuit at room temperature is denoted as $t_{max}$, and the capacitance C of the capacitor and the resistance R of the resistor are determined to further satisfy a following formula:

$$t_{max} \geq CR \log\left(\frac{V_{CC}}{V_{CC} - V_T}\right).$$

3. The method for designing a reset circuit according to claim 2, wherein the capacitance C of the capacitor and the resistance R of the resistor are determined by replacing a following formula:

$$t_d \leq C \frac{R R_D(T)}{R + R_D(T)} \log\left(\frac{V_{CC}}{V_{CC} - V_T}\right)$$

with a following formula:

$$t_d \leq C R_D(T) \log\left(\frac{V_{CC}}{V_{CC} - V_T}\right).$$

4. A method for designing a reset circuit which outputs a reset signal to a CPU in a high temperature environment, the reset circuit including a resistor, a diode, a capacitor, a power input terminal, a power return terminal, and an output terminal which outputs a reset signal, the power input terminal, the resistor, the capacitor, and the power return terminal being connected in series in an order of the power input terminal, the resistor, the capacitor, and the power return terminal, the diode being connected in parallel with the resistor between the power input terminal and the capacitor in a manner such that a cathode is on a side closer to the power input terminal and an anode is on a side closer to the capacitor, and the output terminal being connected to the capacitor on a side being closer to the resistor, the method comprising:

obtaining specified time $t_d$ for a reset operation, the specified time $t_d$ being specified by the CPU, a drive voltage $V_{CC}$ of the reset circuit, and a reset release voltage $V_T$;

setting a value of the resistor so as to obtain 1 or greater of value a, the value a being obtained by dividing time, during which the reset signal rises from zero volt to $V_T$ when capacitance of the capacitor is set to $C_0$ and the reset circuit is operated at room temperature, by $t_d$;

measuring a reverse resistance $R_D(T)$ of the diode at high temperature T, at which the reset circuit is operated; and setting the capacitance of the capacitor to following $C_1$ or greater:

$$C_1 = \frac{C_0}{a} + \frac{t_d}{R_D(T) \log\left(\frac{V_{CC}}{V_{CC} - V_T}\right)}.$$

5. A reset circuit which outputs a reset signal to a CPU in a high temperature environment, the reset circuit comprising:

a resistor; a diode; a capacitor; a power input terminal; a power return terminal; and an output terminal which outputs a reset signal, wherein the power input terminal, the resistor, the capacitor, and the power return terminal are connected in series in an order of the power input terminal, the resistor, the capacitor, and the power return terminal, the diode is connected in parallel with the resistor between the power input terminal and the capacitor in a manner such that a cathode is on a side closer to the power input terminal and an anode is on a side closer to the capacitor, the output terminal is connected to the capacitor on a side being closer to the resistor, when a reverse resistance of the diode at high temperature T, at which the reset circuit is operated, is denoted as $R_D(T)$, a resistance of the resistor is denoted as R, and capacitance of the capacitor is denoted as C, a time constant of the reset circuit at the high temperature T is given by a following formula:

$$C \frac{R R_D(T)}{R + R_D(T)},$$

and time during which the reset signal rises from zero volt to a reset release threshold voltage at the high temperature T, the time being referred to as rise time, is equal to or longer than specified time for a reset operation, the specified time being specified by the CPU.

6. The reset circuit according to claim 5, wherein a time constant of the reset circuit at room temperature is given by a product of the C and the R, and the capacitance C of the capacitor and the resistance R of the resistor are determined so that time, during which the reset signal rises from zero volt to a reset release threshold voltage at room temperature, is predetermined time or shorter.

7. The reset circuit according to claim 6, wherein a time constant of the reset circuit at the high temperature T is approximated to be a product of the C and the $R_D(T)$ so as to determine the capacitance C of the capacitor and the resistance R.

8. A reset circuit which outputs a reset signal to a CPU in a high temperature environment, the reset circuit comprising:

a resistor; a diode; a capacitor; a power input terminal; a power return terminal; and an output terminal which outputs a reset signal, wherein the power input terminal, the resistor, the capacitor, and the power return terminal are connected in series in an order of the power input terminal, the resistor, the capacitor, and the power return terminal, the diode is connected in parallel with the resistor between the power input terminal and the capacitor in a manner such that a cathode is on a side closer to the power input terminal and an anode is on a side closer to the capacitor, the output terminal is connected to the capacitor on a side being closer to the resistor, in an operation at room temperature with capacitance of the capacitor set to $C_0$, where a reverse resistance of the diode at high temperature T, at which the reset circuit is operated, is denoted as $R_D(T)$, specified time for a reset operation, the specified time being specified by the CPU, is denoted as $t_d$, a drive voltage of the reset circuit is denoted as $V_{CC}$, and a reset release voltage is denoted as $V_T$, when time during which the reset signal rises from zero volt to $V_T$ is a $t_d$ (a≥1), the capacitance of the capacitor is set to be equal to or greater than following $C_1$:

$$C_1 = \frac{C_0}{a} + \frac{t_d}{R_D(T) \log\left(\frac{V_{CC}}{V_{CC} - V_T}\right)}.$$

* * * * *